G. Q. LEWIS.
FRICTION BARREL.
APPLICATION FILED NOV. 15, 1919.
1,372,705.
Patented Mar. 29, 1921.
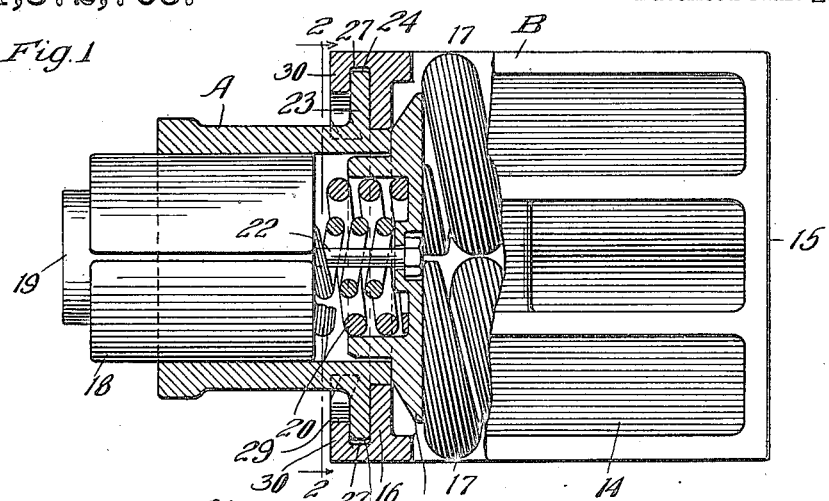
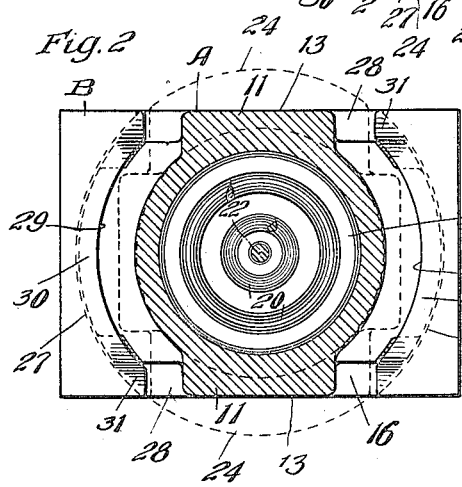
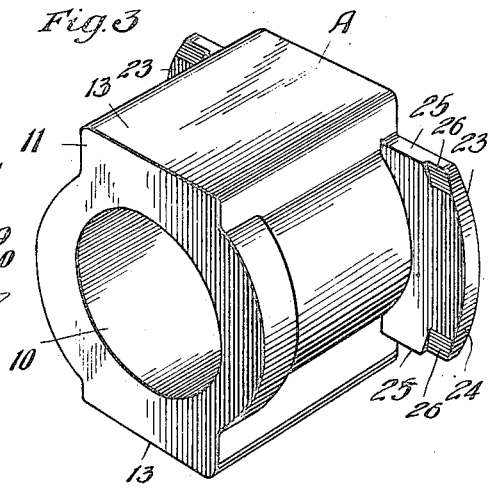
Witnesses
Wm. Geiger
Inventor
Goodrich Q. Lewis
By Geo. I. Haight
His Atty.

UNITED STATES PATENT OFFICE.

GOODRICH Q. LEWIS, OF CHICAGO, ILLINOIS, ASSIGNOR TO WILLIAM H. MINER, OF CHAZY, NEW YORK.

FRICTION-BARREL.

1,372,705.	Specification of Letters Patent.	Patented Mar. 29, 1921.

Application filed November 15, 1919. Serial No. 338,239.

*To all whom it may concern:*

Be it known that I, GOODRICH Q. LEWIS, a citizen of the United States, residing at Chicago, in the county of Cook and State of Illinois, have invented a certain new and useful Improvement in Friction-Barrels, of which the following is a full, clear, concise, and exact description, reference being had to the accompanying drawings, forming a part of this specification.

This invention relates to improvements in friction barrels.

Heretofore, it has been the general practice in the art of friction draft gears for railway cars to form the friction shell and spring cage integrally, the shell and cage constituting what has been termed either a friction cylinder or friction barrel. As is well known, the greatest wear on such cylinders or barrels occurs in the true friction shell proper due to the constant sliding back and forth therein of the friction shoes. The result is that the life of the cylinder or barrel is determined by the life of the friction shell proper and consequently there is an economic loss in the replacement of the cylinder or barrel inasmuch as the spring cage is not subjected to any appreciable wear and would ordinarily be in condition to perform its function for a much longer time.

The object of my invention is to provide a friction cylinder or friction barrel particularly adapted for friction draft gears wherein the friction shell proper and the spring cage are independently formed and either part may be readily renewed or replaced without the necessity of renewing or replacing the entire friction barrel.

More specifically, the object of my invention is to provide a friction cylinder or barrel wherein the shell and spring cage are independently formed and adapted to be rigidly united by means formed integrally on the shell and cage, the uniting means being such that the shell and cage may be readily separated or dis-assembled without any destructive effect on the uniting means.

In the drawing forming a part of this specification, Figure 1 is part sectional part elevational view of a friction gear embodying my improvements, the type of gear shown being of the well known "Miner" type. Fig. 2 is a transverse sectional view taken substantially on the line 2—2 of Fig. 1. Fig. 3 is a detailed perspective of the friction shell proper detached.

In said drawing, the friction cylinder or barrel is comprised of a friction shell proper designated generally by the reference A and a spring cage designated by the reference B. The shell A is of generally cylindrical form and has an interior cylindrical friction surface 10 and at top and bottom is provided with enlargements indicated at 11—11 the same having upper and lower flat bearing surfaces 13—13 adapted to fit within the usual upper and lower arms of the yoke.

The cage B, as shown, is of generally rectangular cross section having top and bottom walls 14, rear connecting wall 15 and front transverse wall 16. The cage is open at its sides in the usual manner to permit the insertion, laterally of the twin springs 17—17. The friction elements within the shell A comprise a plurality of circularly arranged friction shoes 18, wedge 19, anti-friction rollers between the wedge and shoes (not shown), a preliminary spring 20, spring follower 21, retaining bolt 22, and the main springs 17. The arrangement of said elements and their operation are well known and need not be described in detail.

To form a rigid but at the same time readily detachable connection between the shell A and cage B I employ the following means: On the shell A, near its rear end I form diametrically disposed laterally extending integral flanges 23—23. Each of said flanges 23 has an arcuate outer edge 24 and straight side edges 25—25. Where the outer edge 24 unites with the side edges 25, each flange is preferably beveled as indicated at 26 on that face nearest the outer end of the shell.

On the cage B, forwardly of the front wall 16, I form two diametrically disposed undercut arcuate grooves 27—27 each of which extends through an arc not greater than 90° so as to interrupt such undercut grooves 27 or leave gaps therebetween as indicated at 28—28 in Fig. 2. As will be understood, the radius for the undercut grooves 27 is made slightly greater than the radius for the arcuate edges 24 of the flanges 23 so that said flanges 23 may be rotated within said grooves 27 and fit snugly therewithin. The inner edges 29 of the overhanging flanges 30 which define the grooves 27, are also formed on arcs of a circle the radius of which is great enough to permit the enlargements 11 of the shell to clear said edges during relative rotation of the shell and cage. In actual practice, the cage B will be made of malleable iron so that the extreme ends of the flanges 30 as indicated at 31—31 may be bent without danger of fracture.

In assembling the shell and cage, the shell is positioned so as to bring the flanges 23 thereof within the gaps 28. The shell is then rotated through an arc of 90°, thus bringing the flanges 23 within the grooves 27 and the shell in proper position with respect to the cage B. Thereupon the end portions 31 of the flanges 30 are hammered down over the beveled corners 26 of the flanges 23 at the four places indicated in Fig. 2 so that the shell and cage are rigidly locked in proper position. When necessary to replace the shell, the parts can be separated merely by spreading or bending back the corners 31 of the flanges 30 whereupon the shell A may be rotated and the flanges 23 thereof disengaged from the grooves 27.

With my construction, the securing means are formed integrally on the shell and cage; they may be made of sufficient strength to withstand the usual heavy service; and the uniting means are so designed that the shell and cage may be shipped in proper assembled relation without the employment of any other means such as the interior parts of the gear, to hold them in proper assembled relation. This last advantage is of considerable importance where the barrel as a whole is shipped without any of the interior parts since it positively eliminates any chance of the car companies or railroad companies, of improperly assembling the shell and cage.

Although I have herein shown and described what I now consider the preferred manner of carrying out the invention, the same is merely illustrative and I contemplate all changes and modifications that come within the scope of the claim appended hereto.

I claim:

As an article of manufacture, a friction barrel for railway friction draft gears, said barrel comprising a friction shell and a spring cage independently formed, said shell and cage having integrally formed coöperating means for holding them rigidly in assembled position, said means comprising laterally projecting peripherally separated flanges on one of said elements, and separated, correspondingly located undercut slots on the other of said elements, each of said slots extending for a greater length than the corresponding flanges and having the ends of the overhanging flanges defining said slots bent down over the sides of said laterally projecting flanges.

In witness that I claim the foregoing I have hereunto subscribed my name this 5th day of Nov. 1919.

GOODRICH Q. LEWIS.